Feb. 8, 1938.  W. H. FOSTER  2,107,858

LUBRICATING DEVICE

Filed April 7, 1936

William H. Foster
INVENTOR

BY
ATTORNEY

Patented Feb. 8, 1938

2,107,858

UNITED STATES PATENT OFFICE 2,107,858

LUBRICATING DEVICE

William H. Foster, Bayside, N. Y., assignor to Socony-Vacuum Oil Company, Incorporated, New York, N. Y., a corporation of New York Application April 7, 1936, Serial No. 73,117

1 Claim. (Cl. 184—69)

This invention is directed to improvements in the method of lubricating reciprocating engine parts, particularly such parts as the rod pins of locomotives, and similar equipment.

Present methods of lubricating such equipment are either grease cups employing comparatively hard grease, "alemite" or similar cups employing comparatively soft grease, or in some few cases, oil cups employing liquid oil fed to the lubricated surfaces by a wick or similar device. Liquid oil was once quite commonly used for such services, but is not particularly effective in such uses, nor economical, and has been largely abandoned. When it was used, it was applied either through some slowly continuous feed device, such as a wick, with consequent feed whether the engine was operating or not, resulting in waste, or from an oil cup fitted with a valve seat in which was placed a loose valve, which raised from the seat at intervals due to the reciprocating motion of the part to which it was attached, and fed a small portion of oil to the bearing. When the more efficient and more economical greases were developed for these services, such devices were largely abandoned. Grease lubrication by grease cup affords a method whereby grease can be forced into the bearing to be lubricated at intervals, but only when the engine is not operating, by turning down the grease cup. So-called alemite type lubrication is merely a modified type of grease-cup lubricating, in which a softer grease is used and applied under pressure, and offers no more opportunity for replenishing the grease actually in the bearing while the engine is in operation. With the newer designs of equipment, such as roller bearing, for rod-pins, and the like, the need for continuously replenished lubricants in the bearing becomes imperative, and no one of the present methods of lubrication so far as I am aware, affords a means of continuously supplying a lubricant of the type required by such equipment.

It is an object of this invention to provide a lubricating device capable of permitting initial priming of the lubricated parts of a reciprocating engine when not in operation, and thereafter capable of self-actuation to continuously replenish such lubricant while the engine is in motion.

Figure 1:
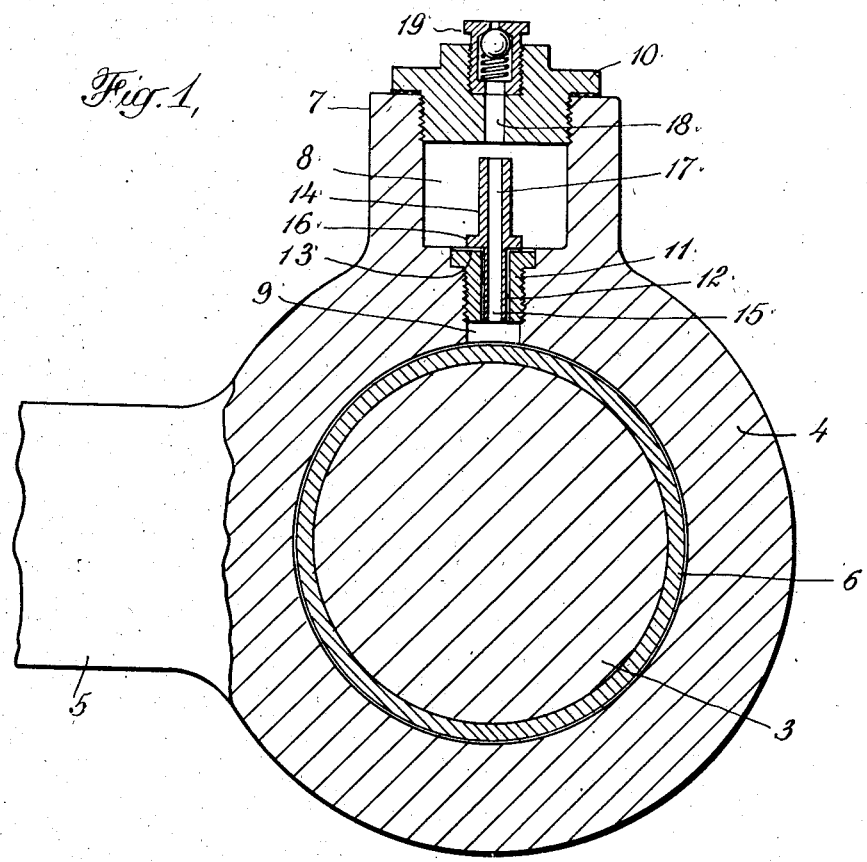
Figure 2:
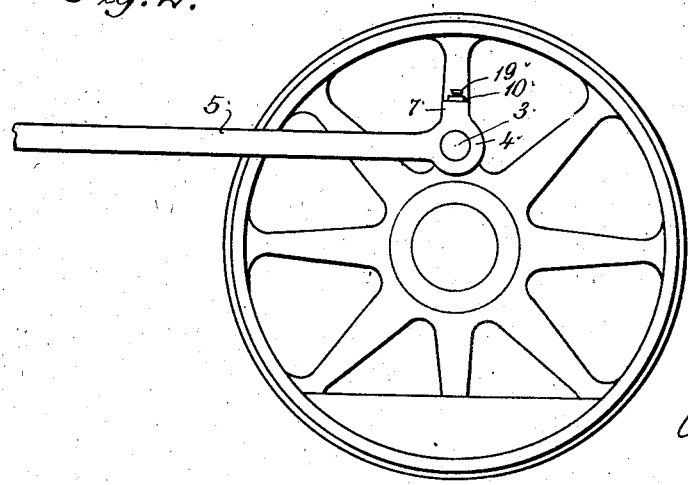

To more clearly understand my novel lubricating device and the manner in which it accomplishes these objects, reference is now made to the drawing attached to and made a part of this specification. In this drawing, Figure 1 shows a section through a rod pin and bushing on which my lubricating device is mounted, and Figure 2 shows how it is applied in lubrication of a locomotive. In Figure 1, 3 is the rod pin, 4 is the rod yoke, 5 is the rod and 6 is the bushing, which may be of the stationary type as shown, or of the floating type, or may be a roller bearing device. Upon the upper side of the rod yoke 4 there is a boss 7, drilled to provide a grease chamber 8, communicating with the bushing through passage 9. The grease chamber 8 is covered by cap 10. The parts 8, 9, and 10 form a grease cup of usual type, and may be substituted by any similar construction, as by a separately assembled grease cup which is equipped with a threaded neck to screw into passage 9. That is to say, the grease cup need not be integral with the rod yoke as shown, but may be a separate assembly, although I prefer the integral form. In either form, the grease chamber 8 communicates with passage 9 through a valve bushing 11, centrally drilled to provide passage 12, its upper surface being faced to provide valve seat 13. Upon valve bushing 11 rests valve 14, which consists of two cylindrical portions separated by a flat flange-like collar. The lower portion of 14, viz., 15, extends through passage 12 and fits loosely therein. The flat collar 16, rests upon the valve face 13, and through the center portion of valve 14, passage 17 is provided. Cap 10 is provided with a passage 18 in which a spring-and-ball valve filling nipple 19 is mounted.

The method of operation of this device is as follows: The engine being at rest, a pressure charging device is applied to filling nipple 19. The chamber 8 fills first, valve 14 remaining seated, and then grease is forced down through passage 16 in valve 14, and through passage 9 until the bearing 6 and pin 3 is fully primed and filling stops. When the engine moves and grease in passages 9 and 17 is consumed by the bearing 6, the motion of the rod causes valve 14 to rise intermittently and reseat, furnishing further supply of grease from chamber 8. On each such motion, the collar 16 scrapes in a small amount of grease from grease chamber 8, and it is forced through passage 12 around the loosely fitting valve portion 15, and the supply of grease in contact with the bearing is constantly replenished. The vertical travel of valve 14 is limited by the clearance between its upward extension and the bottom of cap 10, or if desired a cage may be placed within chamber 8, or a bar placed across chamber 8 to so limit its travel. The amount of grease so fed may be determined by the clearance between stem 15 and the walls of passage 12, and by the lift of valve 14, both in view of the nature of grease used and type of service of the bearing on which they are placed. For example, when using a soda soap base grease of a consistency which has an unworked penetration of 270 and a worked penetration of 300, made by compounding soda soap with 100 viscosity mineral oil, I prefer to use a passage 12 of ¼-inch internal diameter with a clearance around member 15 of from 0.006 to 0.015 inch, the smaller clearances being used on more rapidly moving equipment and the larger on such points as the main rods of switching locomotives. With such grease the preferable lift of valve 14 will range from ¼-inch for slow moving equipment to ⅛-inch for rapidly moving engines.

No lubricating device of which I am at present aware is capable of permitting the preliminary priming of a lubricated part, as with soft grease, and thereafter intermittently replenishing the lubricant as required while the engine to which it is attached is in motion. My device is admirably adapted for that purpose. Ability to so lubricate is particularly important with equipment of the newer types, such as high speed locomotives equipped with floating bushings, roller bearings, etc., and jacketed for streamlining to cut down wind resistance. In such cases the temperatures under which bearings must work are high and continuous lubrication is imperative. With devices capable only of priming, but not of feeding thereafter, bearings are usually badly in need of lubricant before the end of a run. With feeding lubricators of all prior types known to me, priming can only be accomplished by dismantling the lubricator, or by providing a second fitting with consequent increase of maintenance cost and danger of poor servicing.

I am aware that my device may take other forms and it is my intention to claim such forms and the novelty therein, except as limited in the following claim.

I claim:

A lubricating device for a reciprocating engine part, comprising a capped lubricant cup and a passage leading to the point of lubricant application, in said passage a bushing having a cylindrical central passage and a horizontal valve seat surface upon its upper end, a valve pin extending within said bushing and having an upper and lower shank and a shoulder therebetween, the lower shank of the pin being cylindrical and fitting entirely within the central passage of the bushing closely enough to permit only substantially axial motion therein, the shoulder having a horizontal upper surface and a horizontal lower surface, said lower surface cooperating with the valve seat to form a closure, the upper shank extending vertically to a point adjacent the cup cap, a passage throughout the length of the valve pin, the vertical throw of said valve pin being limited by contact with said cup cap, the vertical throw of the pin, the external diameter of the shoulder and the annular lower-shank clearance being relatively proportioned to give a predetermined rate of lubricant discharge.

WILLIAM H. FOSTER.